US009083585B2

(12) United States Patent
Oran

(10) Patent No.: US 9,083,585 B2
(45) Date of Patent: Jul. 14, 2015

(54) RETRANSMISSION-BASED STREAM REPAIR AND STREAM JOIN

(71) Applicant: Cisco Technology, Inc., San Jose, CA (US)

(72) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 14/045,813

(22) Filed: Oct. 4, 2013

(65) Prior Publication Data

US 2014/0029628 A1 Jan. 30, 2014

Related U.S. Application Data

(60) Division of application No. 13/043,437, filed on Mar. 8, 2011, now Pat. No. 8,588,077, which is a continuation of application No. 11/561,237, filed on Nov. 17, 2006, now Pat. No. 8,031,701.

(60) Provisional application No. 60/825,268, filed on Sep. 11, 2006.

(51) Int. Cl.
*H04L 12/28* (2006.01)
*H04L 12/66* (2006.01)
(Continued)

(52) U.S. Cl.
CPC ........ *H04L 29/08585* (2013.01); *H04L 1/1607* (2013.01); *H04L 29/12783* (2013.01);
(Continued)

(58) Field of Classification Search
CPC ... H04L 65/608; H04L 65/80; H04L 65/4084; H04L 12/1877; H04L 29/06027; H04L 12/185
See application file for complete search history.

(56) References Cited

U.S. PATENT DOCUMENTS 3,840,862 A 10/1974 Ready
4,291,196 A 9/1981 Spaniol et al.
(Continued)

FOREIGN PATENT DOCUMENTS

CH 1847399 A 4/2007
CN 1490976 4/2004
(Continued)

OTHER PUBLICATIONS

Lehman et al., Active Reliable Multicast (ARM), 1998, IEEE, pp. 581-589.
(Continued)

*Primary Examiner* — Melanie Jagannathan
(74) *Attorney, Agent, or Firm* — Merchant & Gould P.C.

(57) ABSTRACT

The Real-time Transport Protocol (RTP) and its related standards define a retransmission packet format and a way to give feedback via Negative ACKnowledge (NACK) packets for data that has been lost. In one embodiment, a unicast RTP repair session is associated with a main Source Specific Multicast (SSM) multicast session. Real-time Transport Control Protocol (RTCP) NACK packets are then used for feedback to a SSM feedback target address. This dynamically instantiates unicast RTP repair for multicast sessions. The repair scheme can be used for repairing multicast channels or joining new multicast channels. In another embodiment, a media transmission device shares an IP address with one or more other media transmission devices. The shared IP address can also be used to route multiple identical multicast media streams to different media stream receivers.

9 Claims, 6 Drawing Sheets

(51) Int. Cl.

| | | |
|---|---|---|
| *H04L 1/18* | (2006.01) | |
| *H04L 29/08* | (2006.01) | |
| *H04L 1/16* | (2006.01) | |
| *H04L 29/12* | (2006.01) | |
| *H04L 12/721* | (2013.01) | |
| *H04L 12/761* | (2013.01) | |
| *H04L 29/06* | (2006.01) | |
| *H04L 1/00* | (2006.01) | |

(52) U.S. Cl.
CPC ............... *H04L45/12* (2013.01); *H04L 45/16* (2013.01); *H04L 61/35* (2013.01); *H04L 65/4076* (2013.01); *H04L 65/608* (2013.01); *H04L 65/80* (2013.01); *H04L 69/326* (2013.01); *H04L 2001/0093* (2013.01)

(56) References Cited

U.S. PATENT DOCUMENTS

| | | | |
|---|---|---|---|
| 4,426,682 A | 1/1984 | Riffe et al. | |
| 4,802,085 A | 1/1989 | Levy et al. | |
| 4,811,203 A | 3/1989 | Hamstra | |
| 5,155,824 A | 10/1992 | Edenfield et al. | |
| 5,307,477 A | 4/1994 | Taylor | |
| 5,444,718 A | 8/1995 | Ejzak et al. | |
| 5,483,587 A | 1/1996 | Hogan et al. | |
| 5,524,235 A | 6/1996 | Larson et al. | |
| 5,551,001 A | 8/1996 | Cohen et al. | |
| 5,600,366 A | 2/1997 | Schulman | |
| 5,600,663 A | 2/1997 | Ayanoglu et al. | |
| 5,636,354 A | 6/1997 | Lear | |
| 5,673,253 A | 9/1997 | Shaffer | |
| 5,729,687 A | 3/1998 | Rothrock et al. | |
| 5,734,861 A | 3/1998 | Cohn et al. | |
| 5,784,362 A | 7/1998 | Turina | |
| 5,828,844 A | 10/1998 | Civanlar | |
| 5,870,763 A | 2/1999 | Lomet | |
| 5,914,757 A | 6/1999 | Dean et al. | |
| 5,926,227 A | 7/1999 | Schoner et al. | |
| 5,933,195 A | 8/1999 | Florencio | |
| 5,933,593 A | 8/1999 | Arun et al. | |
| 5,963,217 A | 10/1999 | Grayson et al. | |
| 5,974,028 A | 10/1999 | Ramakrishnan | |
| 6,003,116 A | 12/1999 | Morita et al. | |
| 6,031,818 A | 2/2000 | Lo et al. | |
| 6,034,746 A | 3/2000 | Desai et al. | |
| 6,065,050 A | 5/2000 | DeMoney | |
| 6,119,205 A | 9/2000 | Wicki et al. | |
| 6,137,834 A | 10/2000 | Wine et al. | |
| 6,141,324 A | 10/2000 | Abbott et al. | |
| 6,151,636 A | 11/2000 | Schuster et al. | |
| 6,236,854 B1 | 5/2001 | Bradshaw, Jr. | |
| 6,278,716 B1 | 8/2001 | Rubenstein | |
| 6,289,054 B1 | 9/2001 | Rhee | |
| 6,301,249 B1 | 10/2001 | Mansfield et al. | |
| 6,332,153 B1 | 12/2001 | Cohen | |
| 6,445,717 B1 | 9/2002 | Gibson et al. | |
| 6,501,739 B1 | 12/2002 | Cohen | |
| 6,516,435 B1 | 2/2003 | Tsunoda | |
| 6,532,562 B1 | 3/2003 | Chou et al. | |
| 6,567,929 B1* | 5/2003 | Bhagavath et al. | ............. 714/18 |
| 6,570,926 B1 | 5/2003 | Agrawal et al. | |
| 6,594,798 B1 | 7/2003 | Chou et al. | |
| 6,608,820 B1 | 8/2003 | Bradshaw, Jr. | |
| 6,608,841 B1 | 8/2003 | Koodli | |
| 6,624,841 B1 | 9/2003 | Buchner et al. | |
| 6,643,496 B1 | 11/2003 | Shimoyama et al. | |
| 6,650,652 B1 | 11/2003 | Valencia | |
| 6,671,262 B1 | 12/2003 | Kung et al. | |
| 6,675,216 B1 | 1/2004 | Quatrano et al. | |
| 6,677,864 B2 | 1/2004 | Khayrallah | |
| 6,711,128 B1 | 3/2004 | Ramakrishnan | |
| 6,721,290 B1 | 4/2004 | Kondylis et al. | |
| 6,735,572 B2 | 5/2004 | Landesmann | |
| 6,744,785 B2 | 6/2004 | Robinett et al. | |
| 6,766,418 B1 | 7/2004 | Alexander | |
| 6,771,644 B1 | 8/2004 | Brassil et al. | |
| 6,775,247 B1 | 8/2004 | Shaffer et al. | |
| 6,782,490 B2 | 8/2004 | Maxemchuk et al. | |
| 6,792,047 B1 | 9/2004 | Bixby | |
| 6,804,244 B1 | 10/2004 | Anandakumar et al. | |
| 6,816,469 B1 | 11/2004 | Kung et al. | |
| 6,823,470 B2 | 11/2004 | Smith et al. | |
| 6,839,325 B2 | 1/2005 | Schmidl et al. | |
| 6,865,157 B1 | 3/2005 | Scott et al. | |
| 6,865,540 B1 | 3/2005 | Faber et al. | |
| 6,876,734 B1 | 4/2005 | Summers et al. | |
| 6,909,718 B1 | 6/2005 | Aramaki et al. | |
| 6,910,148 B1 | 6/2005 | Ho et al. | |
| 6,925,068 B1 | 8/2005 | Stanwood et al. | |
| 6,931,001 B2 | 8/2005 | Deng | |
| 6,931,113 B2 | 8/2005 | Ortel | |
| 6,937,569 B1 | 8/2005 | Sarkar et al. | |
| 6,947,417 B2 | 9/2005 | Laursen et al. | |
| 6,956,828 B2 | 10/2005 | Simard et al. | |
| 6,959,075 B2 | 10/2005 | Cutaia et al. | |
| 6,976,055 B1 | 12/2005 | Shaffer et al. | |
| 6,989,856 B2 | 1/2006 | Firestone et al. | |
| 6,996,097 B1 | 2/2006 | Chou et al. | |
| 7,003,086 B1 | 2/2006 | Shaffer et al. | |
| 7,007,098 B1 | 2/2006 | Smyth et al. | |
| 7,024,609 B2 | 4/2006 | Wolfgang et al. | |
| 7,084,898 B1 | 8/2006 | Firestone et al. | |
| 7,114,002 B1 | 9/2006 | Okumura et al. | |
| 7,127,487 B1 | 10/2006 | Wang et al. | |
| 7,164,680 B2 | 1/2007 | Loguinov | |
| 7,180,896 B1 | 2/2007 | Okumura et al. | |
| 7,224,702 B2 | 5/2007 | Lee | |
| 7,234,079 B2 | 6/2007 | Cheng et al. | |
| 7,257,664 B2 | 8/2007 | Zhang | |
| 7,263,075 B2 | 8/2007 | Roh et al. | |
| 7,296,205 B2 | 11/2007 | Curcio et al. | |
| 7,324,527 B1 | 1/2008 | Fraas et al. | |
| 7,333,439 B2 | 2/2008 | Itoh et al. | |
| 7,366,172 B2 | 4/2008 | Chou et al. | |
| 7,373,413 B1 | 5/2008 | Nguyen et al. | |
| 7,376,880 B2 | 5/2008 | Ichiki et al. | |
| 7,379,653 B2 | 5/2008 | Yap et al. | |
| 7,392,424 B2 | 6/2008 | Ho et al. | |
| 7,397,759 B2 | 7/2008 | Tan et al. | |
| 7,532,621 B2 | 5/2009 | Birman et al. | |
| 7,562,277 B2 | 7/2009 | Park et al. | |
| 7,599,363 B2 | 10/2009 | Jang et al. | |
| 7,676,591 B2 | 3/2010 | Chan et al. | |
| 7,681,101 B2 | 3/2010 | Oran et al. | |
| 7,697,514 B2 | 4/2010 | Chou et al. | |
| 7,707,303 B2 | 4/2010 | Albers | |
| 7,711,938 B2 | 5/2010 | Wise | |
| 7,747,921 B2 | 6/2010 | DaCosta | |
| 7,751,324 B2 | 7/2010 | Vadakital et al. | |
| 7,801,146 B2 | 9/2010 | Aramaki et al. | |
| 7,870,590 B2 | 1/2011 | Jagadeesan | |
| 7,877,660 B2 | 1/2011 | VerSteeg | |
| 7,886,073 B2 | 2/2011 | Gahm | |
| 7,889,654 B2 | 2/2011 | Ramakrishnan et al. | |
| 7,921,347 B2 | 4/2011 | Kim et al. | |
| 7,937,531 B2 | 5/2011 | Mitra | |
| 7,940,644 B2 | 5/2011 | Oran | |
| 7,940,777 B2 | 5/2011 | Asati | |
| 7,965,771 B2* | 6/2011 | Wu et al. | ................... 375/240.12 |
| 8,031,701 B2 | 10/2011 | Oran | |
| 8,037,392 B1 | 10/2011 | Sahar | |
| 8,218,654 B2 | 7/2012 | Cheng | |
| 8,245,264 B2 | 8/2012 | Toebes | |
| 8,462,847 B2 | 6/2013 | Wu et al. | |
| 8,588,077 B2 | 11/2013 | Oran | |
| 8,711,854 B2 | 4/2014 | Oran et al. | |
| 8,769,591 B2 | 7/2014 | Gahm et al. | |
| 8,787,153 B2 | 7/2014 | Begen et al. | |
| 2001/0000540 A1 | 4/2001 | Cooper et al. | |
| 2002/0004841 A1 | 1/2002 | Sawatari | |
| 2002/0006137 A1 | 1/2002 | Rabenko et al. | |
| 2002/0010938 A1 | 1/2002 | Zhang et al. | |

(56) References Cited

U.S. PATENT DOCUMENTS

| | | |
|---|---|---|
| 2002/0087976 A1 | 7/2002 | Kaplan et al. |
| 2002/0114332 A1 | 8/2002 | Apostolopoulos et al. |
| 2002/0126711 A1 | 9/2002 | Robinett et al. |
| 2002/0163918 A1 | 11/2002 | Cline |
| 2003/0025786 A1 | 2/2003 | Norsworthy |
| 2003/0025832 A1 | 2/2003 | Swart et al. |
| 2003/0076850 A1 | 4/2003 | Jason, Jr. |
| 2003/0101408 A1 | 5/2003 | Martinian et al. |
| 2003/0158899 A1 | 8/2003 | Hughes |
| 2003/0198195 A1 | 10/2003 | Li |
| 2003/0231863 A1 | 12/2003 | Eerenberg et al. |
| 2003/0236903 A1 | 12/2003 | Piotrowski |
| 2004/0057449 A1 | 3/2004 | Black |
| 2004/0071128 A1 | 4/2004 | Jang et al. |
| 2004/0078624 A1 | 4/2004 | Maxemchuk et al. |
| 2004/0100937 A1 | 5/2004 | Chen |
| 2004/0114576 A1 | 6/2004 | Itoh et al. |
| 2004/0143672 A1 | 7/2004 | Padmanabham et al. |
| 2004/0165527 A1 | 8/2004 | Gu et al. |
| 2004/0165710 A1 | 8/2004 | Del Hoyo et al. |
| 2004/0196849 A1 | 10/2004 | Aksu et al. |
| 2004/0199659 A1 | 10/2004 | Ishikawa et al. |
| 2004/0213152 A1 | 10/2004 | Matuoka et al. |
| 2004/0244058 A1 | 12/2004 | Carlucci et al. |
| 2004/0255328 A1 | 12/2004 | Baldwin et al. |
| 2005/0058131 A1 | 3/2005 | Samuels et al. |
| 2005/0069102 A1 | 3/2005 | Chang |
| 2005/0074007 A1 | 4/2005 | Samuels et al. |
| 2005/0078171 A1 | 4/2005 | Firestone et al. |
| 2005/0078698 A1 | 4/2005 | Araya et al. |
| 2005/0081244 A1 | 4/2005 | Barrett et al. |
| 2005/0099499 A1 | 5/2005 | Braunstein |
| 2005/0138372 A1 | 6/2005 | Kajihara et al. |
| 2005/0169174 A1 | 8/2005 | Apostolopoulos et al. |
| 2005/0198367 A1 | 9/2005 | Ettikan |
| 2005/0204242 A1 | 9/2005 | Chou et al. |
| 2005/0207406 A1 | 9/2005 | Reme |
| 2005/0226325 A1 | 10/2005 | Dei et al. |
| 2005/0244137 A1 | 11/2005 | Takashima et al. |
| 2005/0249231 A1 | 11/2005 | Khan |
| 2005/0259803 A1 | 11/2005 | Khartabil |
| 2005/0265346 A1 | 12/2005 | Ho et al. |
| 2005/0289623 A1 | 12/2005 | Midani et al. |
| 2006/0020995 A1 | 1/2006 | Opie et al. |
| 2006/0048193 A1 | 3/2006 | Jacobs et al. |
| 2006/0072596 A1 | 4/2006 | Spilo et al. |
| 2006/0075084 A1 | 4/2006 | Lyon |
| 2006/0075443 A1 | 4/2006 | Eckert |
| 2006/0083263 A1 | 4/2006 | Jagadeesan et al. |
| 2006/0085551 A1 | 4/2006 | Xie et al. |
| 2006/0104458 A1 | 5/2006 | Kenoyer |
| 2006/0120378 A1 | 6/2006 | Usuki et al. |
| 2006/0126667 A1 | 6/2006 | Smith et al. |
| 2006/0143669 A1 | 6/2006 | Cohen |
| 2006/0159093 A1 | 7/2006 | Joo et al. |
| 2006/0187914 A1 | 8/2006 | Gumaste et al. |
| 2006/0188025 A1 | 8/2006 | Hannuksela |
| 2006/0189337 A1 | 8/2006 | Farrill et al. |
| 2006/0200842 A1 | 9/2006 | Chapman et al. |
| 2006/0242240 A1 | 10/2006 | Parker et al. |
| 2006/0242669 A1 | 10/2006 | Wogsberg |
| 2006/0259755 A1 | 11/2006 | Kenoyer |
| 2006/0279437 A1 | 12/2006 | Luby |
| 2007/0008934 A1 | 1/2007 | Balasubramanian et al. |
| 2007/0009235 A1 | 1/2007 | Walters et al. |
| 2007/0044130 A1 | 2/2007 | Skoog |
| 2007/0076703 A1 | 4/2007 | Yoneda et al. |
| 2007/0098079 A1 | 5/2007 | Boyce et al. |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |
| 2007/0200949 A1 | 8/2007 | Walker et al. |
| 2007/0204320 A1 | 8/2007 | Wu et al. |
| 2007/0214490 A1 | 9/2007 | Cheng et al. |
| 2007/0268899 A1 | 11/2007 | Cankaya |
| 2007/0277219 A1 | 11/2007 | Toebes et al. |
| 2007/0292107 A1 | 12/2007 | Yahata et al. |
| 2008/0022340 A1 | 1/2008 | Hannuksela et al. |
| 2008/0062990 A1 | 3/2008 | Oran |
| 2008/0189489 A1 | 8/2008 | Mitra |
| 2008/0192839 A1 | 8/2008 | Gahm et al. |
| 2008/0225850 A1 | 9/2008 | Oran |
| 2008/0253369 A1 | 10/2008 | Oran et al. |
| 2008/0256409 A1 | 10/2008 | Oran et al. |
| 2008/0267078 A1 | 10/2008 | Farinacci |
| 2008/0310435 A1 | 12/2008 | Cagenius et al. |
| 2009/0034627 A1 | 2/2009 | Rodriguez et al. |
| 2009/0034633 A1 | 2/2009 | Rodirguez et al. |
| 2009/0049361 A1 | 2/2009 | Koren et al. |
| 2009/0055540 A1 | 2/2009 | Foti et al. |
| 2009/0119722 A1 | 5/2009 | VerSteeg |
| 2009/0150715 A1 | 6/2009 | Pickens |
| 2009/0201803 A1 | 8/2009 | Filsfils et al. |
| 2009/0201805 A1 | 8/2009 | Begen et al. |
| 2009/0213726 A1 | 8/2009 | Asati |
| 2009/0217318 A1 | 8/2009 | VerSteeg et al. |
| 2010/0005360 A1 | 1/2010 | Begen |
| 2010/0036962 A1 | 2/2010 | Gahm |
| 2011/0131622 A1 | 6/2011 | Wu et al. |
| 2011/0161765 A1 | 6/2011 | Oran |
| 2012/0189007 A1 | 7/2012 | Oran et al. |

FOREIGN PATENT DOCUMENTS

| | | |
|---|---|---|
| CN | 1643857 A | 7/2005 |
| EP | 1271953 | 1/2003 |
| EP | 1553735 | 7/2005 |
| EP | 1581005 | 9/2005 |
| EP | 1608116 | 12/2005 |
| EP | 1670252 | 6/2006 |
| EP | 2007/814246 | 6/2007 |
| EP | 2008728919 | 2/2008 |
| EP | 7814245.2 | 5/2009 |
| EP | 8731381.1 | 11/2009 |
| EP | 2220845 | 8/2010 |
| WO | WO 9718637 | 5/1997 |
| WO | WO 0019693 | 4/2000 |
| WO | WO 0035201 | 6/2000 |
| WO | WO 00/76113 | 12/2000 |
| WO | WO 01/61909 | 8/2001 |
| WO | 2005/048519 A1 | 5/2005 |
| WO | WO 2006/031925 | 3/2006 |
| WO | WO 2006/057606 | 6/2006 |
| WO | WO 2006/107424 | 10/2006 |
| WO | WO 2008/000289 | 1/2008 |
| WO | WO 2008/033644 A2 | 3/2008 |
| WO | WO 2008/033645 A2 | 3/2008 |
| WO | WO 2008/100725 A3 | 8/2008 |
| WO | WO 2008/112465 | 9/2008 |
| WO | 2009/058645 | 5/2009 |
| WO | WO 2009/099847 | 8/2009 |

OTHER PUBLICATIONS

Turner, Jonathan S., "WDM Burst Switching," www.isoc.org/inet99/proceedings/4j/4j_3.htm., 1999.

Byers, John W. et al., "Accessing Multiple Mirror Sites in Parallel: Using Tornado Codes to Speed Up Downloads," IEEE, 1999.

Liang et al., Feedback suppression in reliable multicast protocol, 2000, IEEE, pp. 1436-1439.

Nguyen, Thinh et al., Protocols for Distributed Video Streaming, IEEE ICIP 2002.

Schulzrinne et al., RTP: A Transport Protocol for Real-Time Applications, Network Working Group, 2003, pp. 1-92.

Weaver et al., Reducing the Soft-Error Rate of a High-Performance Microprocessor, Article, 2004, pp. 30-37, IEEE Computer Society.

Cisco Systems, Converge IP and DWDM Layers in the Core Network, http://www.cisco.com/en/US/prod/collateral/routers/ps5763/prod_white_paper0900aecd80395e03.html, 2007.

Handley M. et al., "SIP: Session Initiation Protocol," RFC 2543, Mar. 1999.

(56) References Cited

OTHER PUBLICATIONS

Cisco Systems, Cisco Visual Quality Experience: Product Overview, www.cisco.com/en/US/partners/prod/collateral/video/ps7191/ps7126/product_data_sheet0900aecd8057f446.html , 2009.

Silver Peak Systems, Inc., "Data Center Class WAN Optimization: Latency & Loss Mitigation," www.silver-peak.com/Technology/latency_loss_mitigation.htm., 2010.

Rosenberg, J., et al., "Registration of parityfec MME types," RFC 3009, Nov. 2000, 11 pgs.

Rajamoni, Ramakrishnan, R. Bhagavathula, & R. Pendse, "Timing analysis of block replacement algorithms on disk caches," 43rd IEEE Midwest Symposium on Circuits and Systems, Proceedings, Aug. 8-11, 2000.

Lee, Jung-Hoon, J.S. Lee, & S.D. Kim, "A selective temporal and aggressive spatial cache system based on time interval," 2000 International Conference on Computer Design (IEEE), Proceedings, Sep. 17-20, 2000.

Approach, Inc., "Streaming Media Technical Analysis," Nov. 2000.

Ott, "Extended RTP Profile for RTCP-based Feedback (RTP/AVPF)" draft ieft-av-rtcp-feedback-01-txt., Nov. 21, 2001.

Duffy, "Riverstone Recasts Multicast Video," 2 pgs., Aug. 5, 2002, Network World, Inc., www.networkworld.com/edge/news/2002/0805edge.html.

Luby M., et al., "Forward Error Correction (FEC) Building Block", RFC 3452, Dec. 2002, 16 pgs.

Nguyen, Thinh & Avideh, Protocols for Distributed Video Streaming, Image Processing, 2002, Proceedings, 2002 Int, Oct. 12, 2002, vol. 3, 185-188, ISBN: 0-7803-7622-6.

Degalahal et al., "Analyzing Soft Errors in Leakage Optimized SRAM Design," Article, Jan. 2003, pp. 1-7, 16th International Conference on VSLI Design.

GossamerThreads, "Channel Change Speed," www.gossamer-threads.com/lists/engine?do=post_view_flat;post=13776, Sep. 12, 2003.

T. Friedman, "RTP Control Protocol Extended Reports (RTCP XR)," RFC 3611, Nov. 2003.

Luby M., et al., "Compact Forward Error Correction (FEC) Schemes," RFC 3695, Feb. 2004, 14 pgs.

Li et al., Soft Error and Energy Consumption Interactions: A Data Cache Perspective, Article, Aug. 9, 2004, pp. 1-6, ISLPED '04.

Ott, J., et al., "Extended RTP Profile for RTCP-based Feedback (RTP/AVPF)", draft-ietf-avt-rtcp-feedback-1 1, Aug. 10, 2004, 52 pgs.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

Zhang, Computing Cache Vulnerability to Ransietn Errors and it's Implication, Article, Oct. 2005, pp. 1-9, IEEE Computer Society.

Pendleton et al., "Session Initiation Package for Voice Quality Reporting Event," Sipping Working Group, 2006, pp. 1-24.

Watson, M., "Basic Forward Error Correction (FEC) Schemes," draft-ietf-nmt-bb-fec-basic-schemes-revised-02, Mar. 3, 2006, 17 pgs.

Chesterfield, J., et al., "RTCP Extensions for Single-Source Multicast Sessions," draft-ietf-avt-rtcpssm-1 1, Mar. 6, 2006, 67 pgs.

Rey, J., et al., "RTP Retransmission Payload Format," RFC 4588, Jul. 2006, 24 pgs.

Begen, Ali C., "Enhancing the Multimedia Experience in Emerging Network, a Thesis Presented to the Academic Faculty," Dec. 2006, available at http://etd.gatech.edu/theses/available/etc-11062006-002415/.

International Search Report for PCT/US08/55837 mailed Jul. 3, 2008.

USPTO, PCT International Search Report for PCT/US07/76264, Jul. 7, 2008, 3 pgs.

USPTO, PCT International Search Report for PCT/US08/52907, Jul. 7, 2008, 3 pgs.

Written Opinion of the International Searching Authority for PCT/US08/52907 mailed Jul. 7, 2008.

Written Opinion of the International Searching Authority for PCT/US07/76264 mailed Jul. 7, 2008.

International Search Report for PCT/US07/76265 mailed Aug. 20, 2008.

Written Opinion of the International Searching Authority for PCT/US07/76265 mailed Aug. 20, 2008.

International Search Report for PCT/US09/032305 mailed Oct. 5, 2009.

Supplementary European Search Report for EP08731381, Mar. 26, 2010, 7 pgs.

European Search Report for EP08728919, Aug. 19, 2010, 11 pgs.

Written Opinion of the International Searching Authority for PCT/US08/55837 mailed Jul. 3, 2008.

P.A. Chou and Z. Miao, "Rate-distortion optimized streaming of packetized media," Microsoft Research Technical Report MSR-TR-2001-35, Feb. 2001.

Schulzrinne, H., "RTP: A Transport Protocol for Real-Time Applications," RFC 3550, Jul. 2003, 89 pgs.

Rey et al., "RTP Retransmission Payload Form—RFC 4588", Jul. 1, 2006, 29 pgs.

Written Opinion of the International Searching Authority for PCT/US09/032305 mailed Oct. 5, 2009, 17 pgs.

Chinese First Office Action dated Aug. 3, 2010 cited in Appl. No. 200880004738.8, 16 pgs.

Chinese Second Office Action dated May 20, 2011 cited in Appl. No. 200880004738.8, 11 pgs.

Chinese First Office Action dated Jul. 4, 2011 for Appl. No. 200780022360.X, 11 pgs.

European Office Action dated Oct. 27, 2011 cited in Appl. No. 08 728 919.5 6 pgs.

Chinese Third Office Action dated Oct. 28, 2011 cited in Appl. No. 200880004738.8, 9 pgs.

Chinese Fourth Office Action dated Feb. 22, 2012 cited in Appl. No. 200880004738.8, 7 pgs.

Chinese Second Office Action dated Jul. 2, 2012 for Appl. No. 200780022360.X, 12 pgs.

U.S. Office Action dated Jul. 16, 2010 cited in U.S. Appl. No. 11/674,093, 30 pgs.

U.S. Final Office Action dated Dec. 21, 2010 cited in U.S. Appl. No. 11/674,093, 23 pgs.

U.S. Office Action dated Jul. 16, 2012 cited in U.S. Appl. No. 11/674,093, 38 pgs.

U.S. Office Action dated Oct. 27, 2009 cited in U.S. Appl. No. 12/101,796, 45 pgs.

U.S. Office Action dated Jul. 26, 2010 cited in U.S. Appl. No. 12/101,796, 41 pgs.

U.S. Final Office Action dated Feb. 17, 2011 cited in U.S. Appl. No. 12/101,796, 36 pgs.

U.S. Office Action dated Sep. 27, 2011 cited in U.S. Appl. No. 12/168,772, 17 pgs. (not M&G case).

U.S. Final Office Action dated Jan. 10, 2012 cited in U.S. Appl. No. 12/168,772, 15 pgs. (not M&G case).

U.S. Office Action dated Oct. 24, 2012 cited in U.S. Appl. No. 13/435,431, 25 pgs.

Chinese Third Office Action dated Dec. 3, 2012 cited in Appl. No. 200780022360.X, 8 pgs.

Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174; Abstract Only.

Castro H., et al., "Monitoring Emerging IPv6 Wireless Access Networks," IEEE Wireless Communications, IEEE Service Center, Piscataway, NJ, vol. 12, No. 1, Feb. 2005, XP011127719.

International Search Report for PCT/US08/80882 dated Mar. 30, 2009, 3 pgs.

International Preliminary Report on Patentability (1 pg.) and Written Opinion of the International Search Authority (6 pgs.) for PCT/US08/80882 dated May 4, 2010.

U.S. Office Action dated Jan. 2, 2013 cited in U.S. Appl. No. 13/016,773, 36 pgs.

U.S. Final Office Action dated Jan. 7, 2013 cited in U.S. Appl. No. 11/674,093, 26 pgs.

(56) References Cited

OTHER PUBLICATIONS

European Search Report dated Mar. 7, 2013 cited in Appl. No. 07814246.0, 9 pgs.

Wonyong Yoon et al., "A Combined Group/Tree Approach for Scalable Many-to-many Reliable Multicast," Proceedings IEEE Infocom., vol. 3, Jun. 23, 2002, pp. 1336-1345.

Victor O.K. Li et al., "Internet Multicast Routing and Transport Control Protocols," Proceedings of IEEE, vol. 90, No. 3, Mar. 1, 2002, pp. 360-391.

Hrishikesh Gossain et al., "Multicast: Wired to Wireless," IEEE Communications Magazine, IEEE Service Center, vol. 40, No. 6, Jun. 1, 2002, pp. 116-123.

A. Erramilli et al., "A Performance Analysis of Protocols for Multicast Communication in Broadband Packet Networks," XP010077385, Jun. 13, 1988, pp. 222-226.

Chinese Fourth Office Action dated Mar. 25, 2013 cited in Appl. No. 200780022360.X, 7 pgs.

U.S. Final Office Action dated Apr. 16, 2013 cited in U.S. Appl. No. 13/435,431, 18 pgs.

U.S. Office Action dated Jun. 20, 2013 cited in U.S. Appl. No. 11/674,093, 25 pgs.

U.S. Office Action dated Apr. 9, 2013 cited in U.S. Appl. No. 11/831,906, 22 pgs.

U.S. Office Action (*Ex Parte Quayle*) dated Sep. 20, 2013 cited in U.S. Appl. No. 13/435,431, 7 pgs.

U.S. Final Office Action dated Nov. 13, 2013 cited in U.S. Appl. No. 11/831,906, 32 pgs.

U.S. Final Office Action dated Dec. 9, 2013 cited in U.S. Appl. No. 12/168,772, 16 pgs.

U.S. Final Office Action dated Dec. 31, 2013 cited in U.S. Appl. No. 11/674,093, 8 pgs.

U.S. Final Office Action mailed Mar. 21, 2014 cited in U.S. Appl. No. 12/168,772, 16 pgs.

U.S. Office Action dated Nov. 10, 2014 cited in U.S. Appl. No. 12/168,772, 16 pgs.

\* cited by examiner

US 9,083,585 B2

RETRANSMISSION-BASED STREAM REPAIR AND STREAM JOIN

RELATED APPLICATIONS

This application is a Division of co-pending U.S. application Ser. No. 13/043,437 entitled "Retransmission-Based Stream Repair and Stream Join" filed Mar. 8, 2011, which is a Continuation of U.S. application Ser. No. 11/561,237 filed Nov. 17, 2006, which issued on Oct. 4, 2011 as U.S. Pat. No. 8,031,701, which is incorporated herein by reference, which claims the benefit under provisions of 35 U.S.C. §119(e) of U.S. Provisional Application No. 60/825,268 filed on Sep. 11, 2006, which is also incorporated herein by reference. U.S. application Ser. No. 13/043,437 entitled "Retransmission-Based Stream Repair and Stream Join" filed Mar. 8, 2011 is also incorporated herein by reference.

BACKGROUND

The Real-time Transport Protocol (RTP) and its related standards define a retransmission packet format and a way to give feedback via Negative ACKnowledgment (NACK) packets that data has been lost. The following standards RTP (RFC3550), RTP Retransmission (RFC4588), RTCP Feedback (RFC4585), and RTCP with SSM Sessions (draft-ietf-avt-rtcpssm-11.txt) are all incorporated by reference and describe unicast feedback and retransmission for unicast sessions, and unicast feedback with multicast retransmission for multicast sessions.

However, the RTP protocol suite has limitations when used with certain types of Internet Protocol (IP) media transmissions, such as transmitting streaming video to different endpoints. For example, neither RTP, nor any other common media transmission protocol, can perform unicast repair of multicast media streams or quickly and efficiently switch among different multicast media streams without loss of data.

DETAILED DESCRIPTION

Overview

A Real-time Transport Protocol (RTP)-based unicast repair scheme is used for repairing errors in RTP multicast streams. By modeling the joining of a new media stream as a repair operation, the repair scheme is extended to also rapidly join media channels. It should be noted that the terms channel and stream are used interchangeably below.

Figure 1:
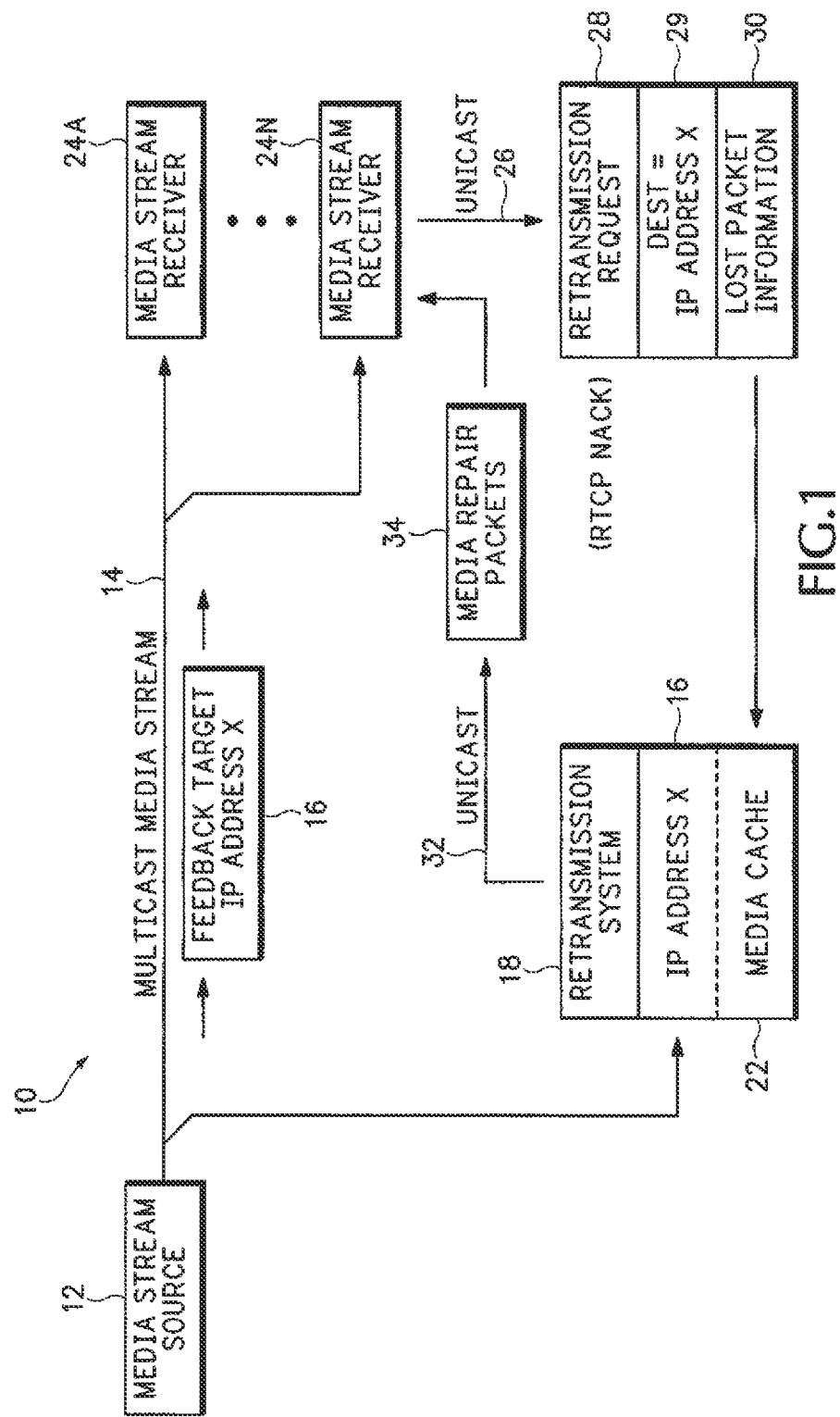
FIG. 1 shows a repair scheme used in a lookaside mode for multicast media streams.

Referring to FIG. 1, a media stream source 12 may be a server, computer, or any other type of network processing device that can source IP media, such as video, audio, voice, data, etc., over an Internet Protocol (IP) network 10. In this example, the media stream source 12 transmits a multicast media stream 14 over the IP network 10 which is received by different media stream receivers 24A-24N and also by a retransmission system 18.

The media stream receivers 24 can be any device that receives and stores or renders the multicast media stream 14. For example, the media stream receivers 24 could be Set Top Boxes (STB), Digital Video Recorders (DVR), computer terminals, Personal Computers (PCs), televisions with IP interfaces, Voice over IP (VoIP) phones, cell phones, Personal Digital Assistants (PDA), etc. The retransmission system 18 can be any type of media server that caches and retransmits portions of the multicast media stream 14. The media stream source 12 and retransmission system 18 are shown as separate devices but could reside in the same physical location and be connected together via a Local Area Network (LAN) or other backplane connectivity.

In one embodiment, a Source Specific Multicast (SSM) multicast session is established for transmitting the multicast media stream 14 between the media stream source 12 and one or more of the media stream receivers 24. The media stream source 12 knows the IP addresses and ports to use for transmitting a particular media stream. The retransmission system 18 knows what IP addresses and ports to use for receiving the media stream and what address and port to use for sending retransmissions. The media stream receivers 24 know what IP address and port to listen for the media stream and the retransmissions, and where to send retransmission requests. All of this address and port information can be described using Session Description Protocol (SDP), but other media description schemes could be used.

The feedback target IP address 16 is used by the media stream receivers 24 as a destination address for requesting retransmissions for portions of the multicast media stream 14. For example, packets from the media stream 14 may not successfully arrive at particular media stream receivers, or may be received in a corrupted state.

The media stream receivers 24 send retransmission requests 28 to the retransmission system 18 associated with the feedback target IP address 16 that includes information 30 identifying the lost media packets. In one example, retransmission requests 28 are unicast Real-time Transport Control Protocol (RTCP) Negative ACKnowledge (NACK) packets that use the feedback target address 16 as a destination address 29. Sending the unicast RTCP NACK packet 28 to the retransmission system 18 dynamically instantiates a unicast RTP repair session from the retransmission system to the requesting receiver, if one does not already exist.

The retransmission system 18 includes a media cache 22 that caches the recent history of packets from the multicast media stream 14. During the unicast RTP repair session, lost packets for media stream 14 are identified in lost packet information 30 of the retransmission request 28. The retransmission system 18 identifies the packets in media cache 22 corresponding to the lost or corrupted packet information 30 in retransmission request 28.

The identified media packets in media cache 22 are sent as unicast media repair packets 34 back to the requesting media stream receiver 28. The media stream receiver 24 then inserts the received unicast media repair packets 34 into corresponding lost packet locations in the media stream 14. Thus, in one embodiment, a repair session uses unicast NACK packets 28 and unicast media repair packets 34 for repairing a multicast media session.

The media configuration shown in FIG. 1 is referred to as a "lookaside mode" because the retransmission system 18 (repair element) is not required to relay the original media stream 14 to the media stream receivers 24. Instead, the media stream source 12 multicasts the media stream 14 directly to the receivers 24. The lookaside mode may produce higher availability since the media stream 14 is not necessarily disrupted if the retransmission system 18 crashes or becomes unavailable.

In this example, only the unicast repair function ceases when the retransmission system 18 fails. Higher performance may also be provided since the retransmission system 18 only receives and caches the multicast media stream 14 and does not also have to retransmit the media stream 14 to the media stream receivers 24. Thus, by only providing media stream repair, the constant work factor for the retransmission system 18 is halved.

In the lookaside mode, the retransmission system 18 is distinguished from the media stream source 12 by using a feedback target address 16 for the retransmission system 18 that is different from the source IP address associated with the SSM media stream source 12.

IP Anycast Addressing

Figure 2:
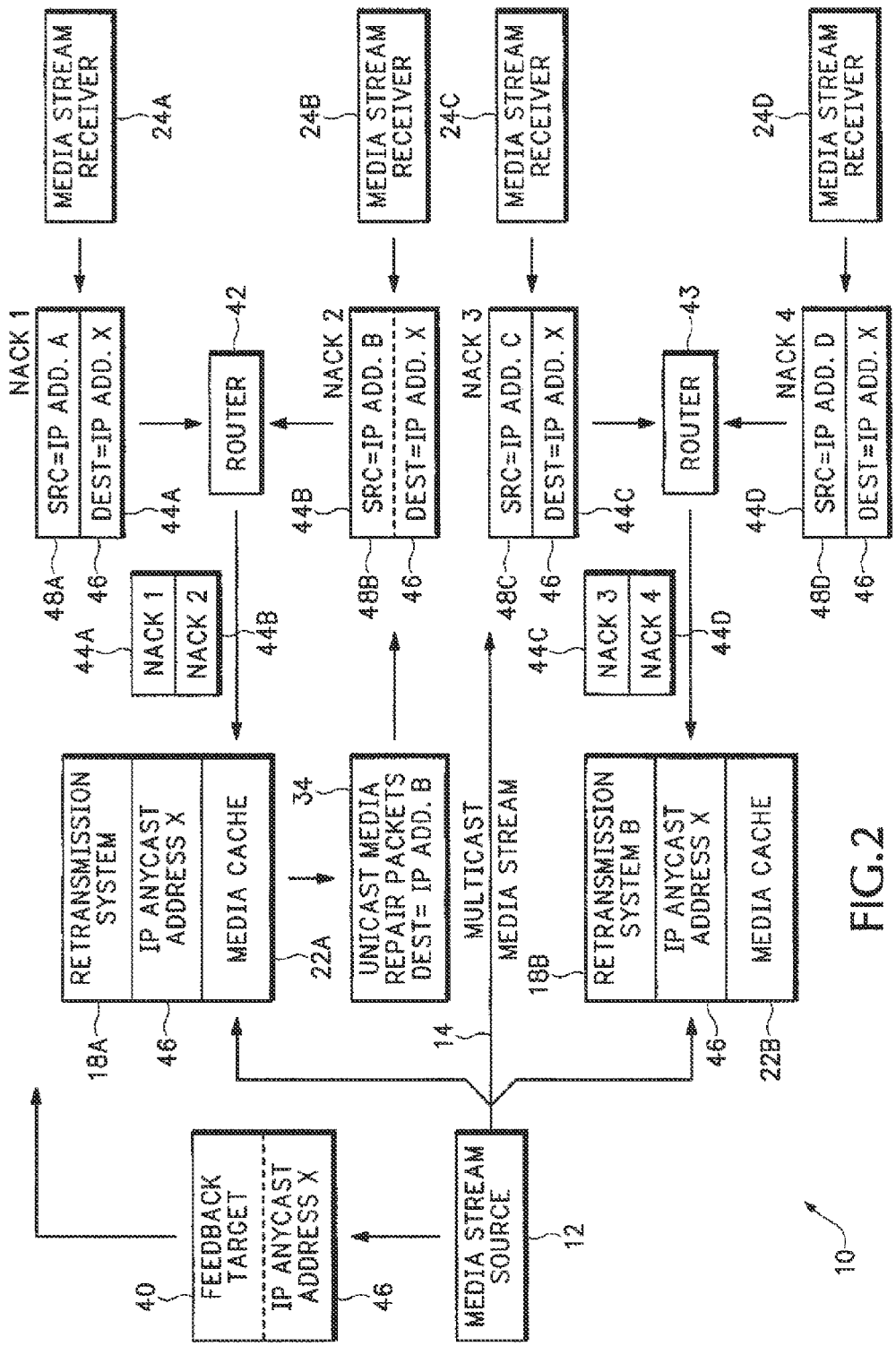
FIG. 2 shows the repair scheme in FIG. 1 using IP anycast addresses.

Referring to FIG. 2, in order to provide both high availability and load sharing, one embodiment of the repair scheme uses an IP anycast address 46 as the feedback target address for the retransmission system 18. This allows repair operations to be adaptively directed to the optimal currently available retransmission system 18A or 18B. The anycast addressing scheme exploits the metrics of IP unicast routing that automatically route packets to network processing devices associated with the cheapest IP routing cost.

To explain in more detail, message 40 identifies a single IP anycast address 46 for multiple different retransmission systems 18A and 18B available for repairing the multicast media stream 14. This SDP is provided to both the retransmission systems 18A and 18B, as well as to the receivers so that they will direct their retransmission requests to that anycast feedback address. Both retransmission system 18A and 18B cache the media stream 14 and are available for retransmitting lost packets to any of the media stream receivers 24A-24D.

Both of the retransmission systems 18A and 18B share the same IP anycast source address 46 identified in message 40. An IP anycast address refers to a unicast IP address that is used as a destination address simultaneously by multiple network processing devices. In this example, the network processing devices sharing IP address 46 include retransmission systems 18A and 18B.

The retransmission systems 18A and 18B and the media stream receivers 24 operate in substantially the same manner as described above in FIG. 1. In this example, all of the media stream receivers 24A-24D each receive the same multicast media stream 14 from media stream source 12. Alternatively, the media stream receivers 24 could indirectly receive the multicast media stream 14 via a separate multicast stream sourced from one of the retransmission systems 18A or 18B. This embodiment is referred to as "source mode" and is described in more detail below in FIG. 4.

Any of the media stream receivers 24A-24D may detect lost or corrupted packets or frames from the multicast media stream 14. In response, the receiver 24 sends out a unicast NACK retransmission request message 44. For explanation purposes, each of the media stream receivers 24A-24D in FIG. 2 is currently receiving the media stream 14 and one or more of them has identified lost packets from the media stream 14. Respectively, the receivers 24A-24D experiencing loss or corruption send out retransmission request messages 44A-44D.

Each of the retransmission request messages 44A-44D includes the same IP anycast destination address 46 along with the associated media stream receiver source address 48A-48D, respectively. The retransmission request messages 44A-44D also include lost packet information identifying which of the packets were lost from the multicast media stream 14.

Routers 42 and 44 in the IP network 10 use internal routing metrics to select which of the retransmission systems 18A or 18B has the cheapest IP routing cost for routing the messages 44A-44D. Since the IP anycast address 46 is shared by two different network processing devices 18A and 18B, the conventional routing metrics in the routers 42 and 43 will automatically select one of the two devices 18A or 18B for forwarding any messages 44A-44D. In this example, router 42 determines that retransmission system 18A has the shortest routing path for the retransmission request messages 44A and 44B received from receivers 24A and 24B, respectively. Alternatively, router 43 determines that retransmission system 18B has the shortest routing path for the retransmission request messages 44C and 44D received from receivers 24C and 24D, respectively.

Retransmission system 18A receives unicast NACK retransmission request messages 44A and 44B and retransmission system 18B receives unicast NACK retransmission request messages 44C and 44D. The retransmission system 18A responds back by sending unicast media repair packets from its cache of multicast media stream 14 back to receivers 24A and 24B. For example, retransmission system 18A sends unicast media repair packets 34 back to the media stream receiver 24B identified in message 44B. Retransmission system 18B responds to retransmission request messages 44C and 44D by sending unicast media repair packets from its cache of multicast media stream 14 back to receivers 24C and 24D, respectively.

This distributed routing of retransmission requests 44A-44D increases both availability and load sharing capacity while using substantially the same repair scheme described above in FIG. 1. For example, if either of the retransmission systems 18A or 18B is disabled, the routers 42 and 44 will automatically drop the disabled retransmission system from internal routing tables. Accordingly, repair requests previously routed to the disabled retransmission system 18 are automatically rerouted to a different one of the operational retransmission systems 18.

Figure 3:
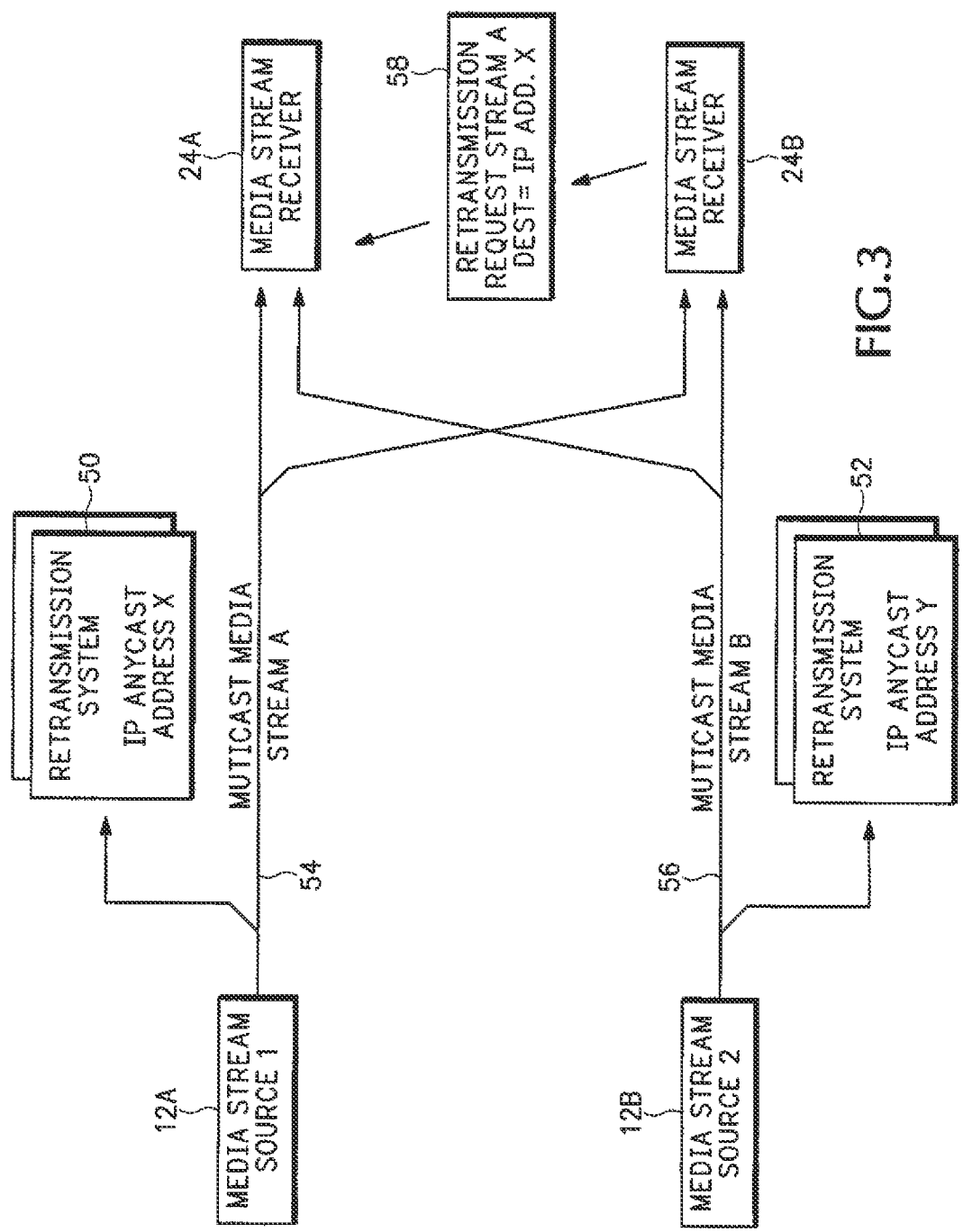
FIG. 3 is a diagram showing how different media streams can be associated with different IP anycast addresses.

FIG. 3 shows different IP anycast addresses used as feedback addresses for different media streams 54 and 56. This further increases the scalability of the media repair scheme by allowing one or more different retransmission systems 50 and 52 to be associated with different multicast media streams.

For example, one or more retransmission systems 50 can be specifically designated to provide media packet repair for a particular multicast media stream 54. The feedback target IP anycast address identified in the Source Specific Multicast (SSM) multicast session for multicast media stream 54 is used as the source address for each of the retransmission systems 50. Similarly, one or more retransmission systems 52 can be designated to provide media packet repair support for a different multicast media stream 56. The feedback target IP anycast source address identified in the SSM multicast session for the multicast media stream 56 is used as the source address for each of retransmission systems 52.

In this example, media stream receiver 24B is receiving packets for multicast media stream 54. If any of the multicast packets are lost, media stream receiver 24B sends a unicast NACK retransmission request message 58 to the IP anycast destination address X associated with multicast media stream 54. The routers in the IP infrastructure (not shown) automatically route the retransmission request message 58 to one of the retransmission systems 50 which then sends back unicast media repair packets containing the identified lost packets.

Thus, different retransmission systems can be associated with different media streams to further increase the repair scheme scalability. However, in other embodiments, a retransmission system 50 may provide repair support for more than one media stream.

Figure 4:
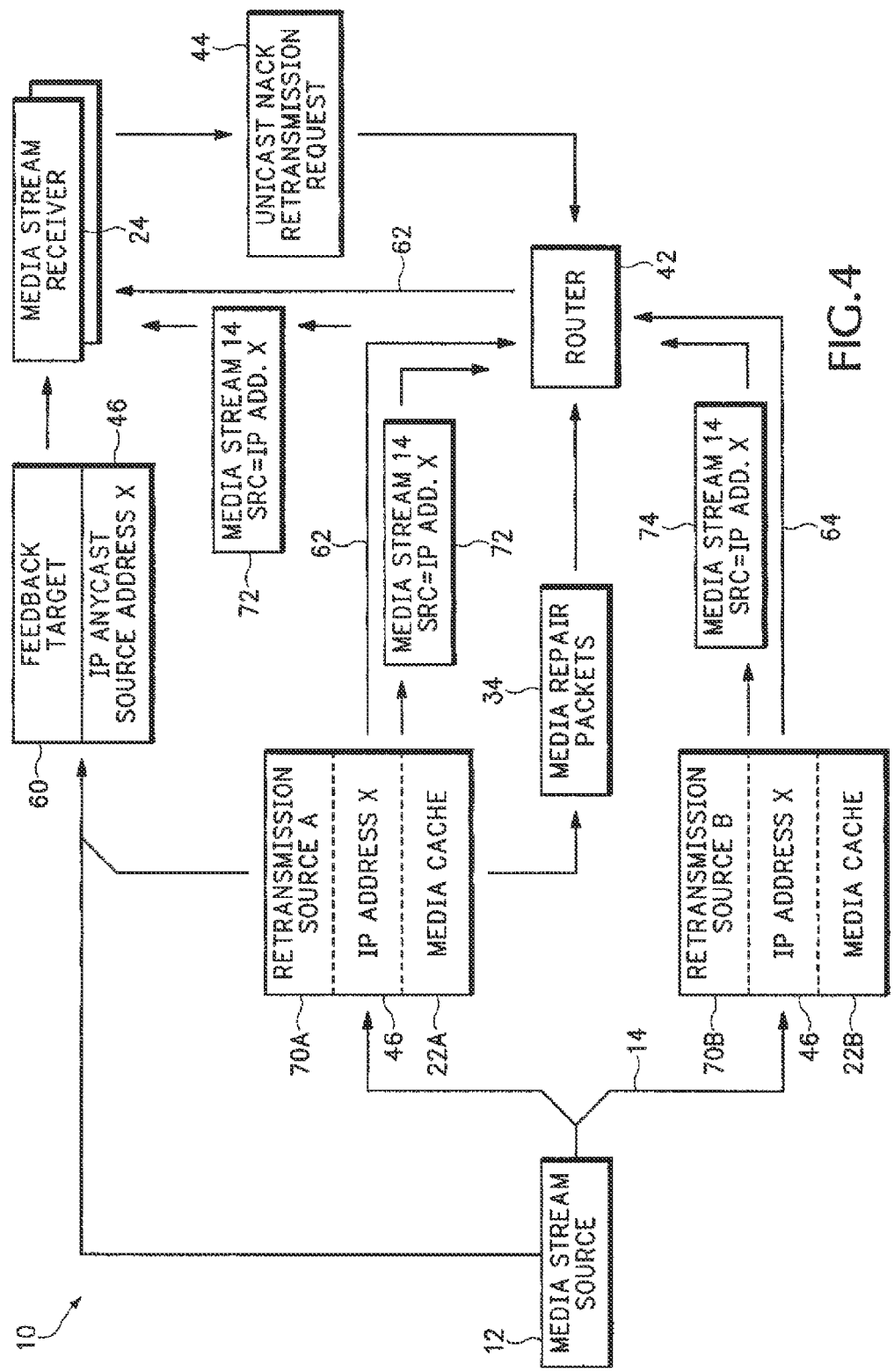
FIG. 4 is a diagram showing how the repair scheme is used in a source mode.

FIG. 4 shows an alternative "source mode" for the repair scheme. In the source mode, retransmission sources 70 provide media stream repair and also operate as SSM distribution sources for the multicast stream 14 originally generated by media stream source 12. The media stream source 12 could be a local encoder, a local splicer, or a separate media stream server operating remotely in the IP network 10 from the retransmission sources 70A and 70B.

The retransmission source 70A caches the original media stream 14 in media cache 22A and if necessary "re-sources" the received media stream 14, operating as a legal RTP mixer/translator according to the RTP specifications. Similarly, retransmission source 70B retransmits the original media stream 14 cached in media cache 22B as multicast media stream 64.

In the source mode, the retransmission sources 70A and 70B still receive unicast NACK retransmission request messages 44 from the media stream receivers 24 when multicast media stream packets are lost. The retransmission sources 70 accordingly send back unicast media repair packets 34 containing the requested lost media.

In one embodiment, the two retransmission sources 70A and 70B also still share the same IP source address 46. This common IP source address 46 for the feedback target can again be identified for the multicast media session using out-of-band or in-band messaging. The messages 60 exchanged between the media stream source 12, retransmission sources 70, and the media stream receivers 24, associate media stream 14 with feedback target IP anycast address 46.

Sharing the same IP destination address 46 provides high availability and load sharing for the repair scheme similar in a similar manner as described above in FIG. 2. However, both retransmission sources 70A and 70B in FIG. 4 also operate as retransmission sources for the media stream 14. Therefore, sharing the same SSM source address 46 also provides higher availability and load sharing with respect to the multicasting of the original media stream 14. Use of an anycast IP address as the SSM source address for the media source provides this capability as well.

For example, retransmission source 70A re-originates media stream 14 as multicast media stream 62 and retransmission source 70B re-originates media stream 14 as multicast media stream 64. The multicast packets 72 for multicast media stream 62 and the multicast packets 74 from multicast media stream 64 each use the same source IP address 46.

Any routers 42 in the IP network 10 receiving both media streams 62 and 64 with the same source address automatically drop packets for one of the two streams according to a basic characteristic of multicast routing known as "reverse path forwarding". For packets being forwarded on a multicast tree, only those received from the upstream branch leading to the source IP address at the root of the tree are accepted for forwarding. In this example, the router 42 drops the multicast packets 74 for media stream 64 and only routes the multicast packets 72 for media stream 62 to the media stream receiver 24.

If retransmission source 70A is ever disabled, the router 42 will re-compute internal routing metrics and then automatically start routing the multicast packets 74 for media stream 64 to media stream receiver 24. Accordingly, using the shared IP anycast address 46 and the SSM source address also provides redundancy and load sharing for the multicast media stream source.

The shared IP source address 46 still increases retransmission repair redundancy and load balancing as described above in FIG. 3 by allowing either of the retransmission sources 70A or 70B to receive and respond to the retransmission requests 44 sent by any of the media stream receivers 24 as described above in FIG. 3. It is also possible that one of the retransmission sources 70 may end up re-originating the multicast media stream to the receiver 24 while the other retransmission source 70 provides media stream repair support by receiving unicast retransmission requests 44 and responding back with media repair packets 34.

Extension of Repair Scheme for Fast Stream Join

Several observations can be made with respect to a stream join as compared with a media stream repair operation. A media stream receiver joining a new RTP session may have no idea what packets are needed to render the current stream. Also since multicast video sessions may be involved, the media stream receiver is in all likelihood "behind" the multicast stream in time and may need to "catch up". This is important because the media stream receiver may not be able to render the media stream until it receives an intra-coded frame that may have passed by shortly before the media stream receiver attempts to join the multicast session.

Figure 5:
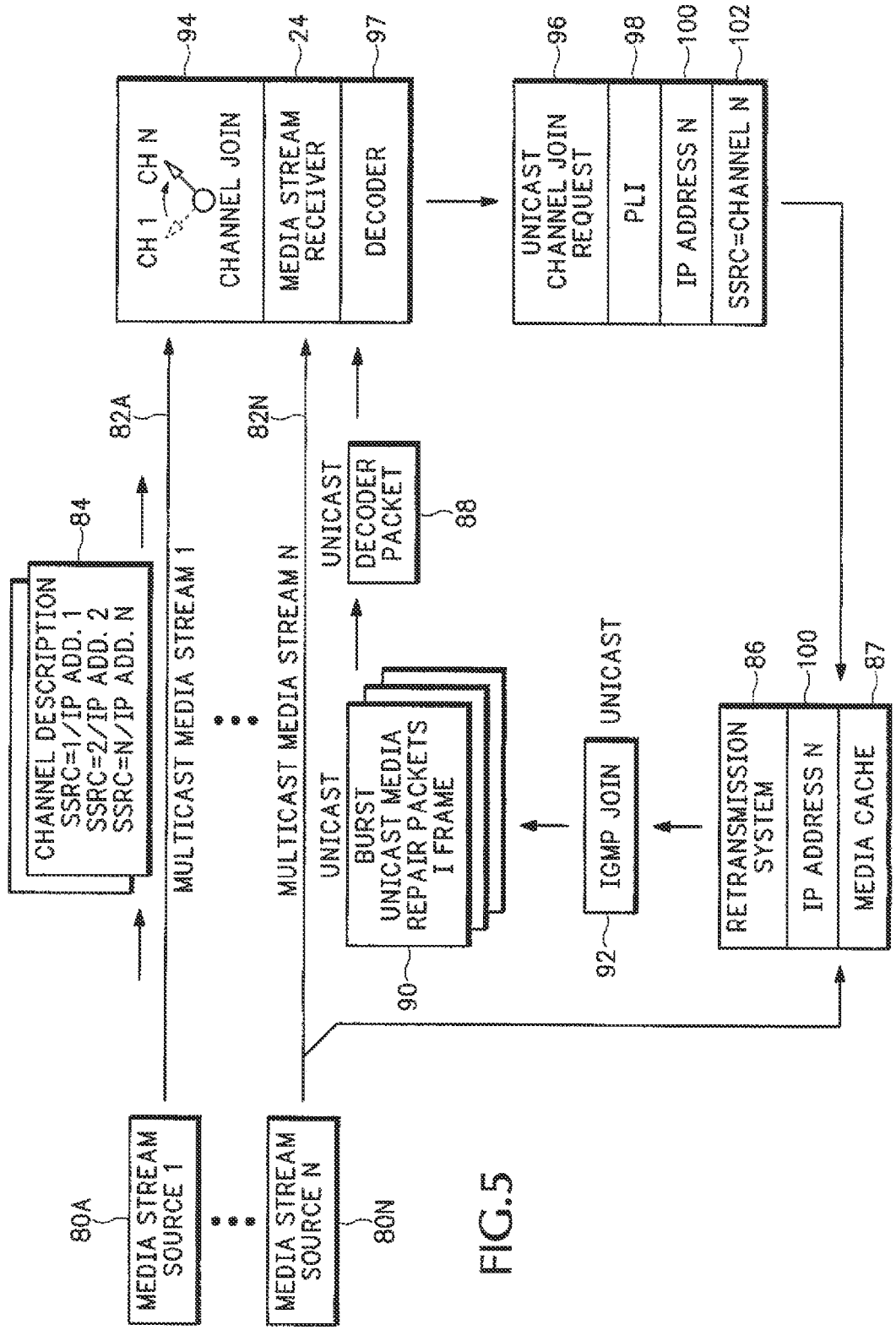
FIG. 5 is a diagram showing another embodiment of a retransmission scheme used for channel joining.

Referring to FIG. 5, a fast stream join scheme (alternatively referred to as a fast channel join) uses a variant of the repair schemes described above. Multiple different multicast media streams 82A-82N are generated by different media stream sources 80A-80N, respectively. Synchronization SouRCes (SSRCs) used by the media streams are communicated out of band to the media stream receivers 24 in the SDP messages 84. The SDP messages 84 also include the feedback target IP addresses for the one or more retransmission systems 86 associated with repairing the multicast media streams as described above.

A media stream receiver 24 detects a request to join a new multicast media stream and sends a unicast request 96 to the retransmission system 86 specifying the new channel which the receiver wishes to receive. A channel join request may detected, for example, by a set top box that detects a user using user interface 94 to select a new or different multicast media channel.

The unicast channel join request 96 in one embodiment is substantially the same RTCP NACK retransmission request message described above in FIGS. 1-4. However, in this embodiment, the message 96 is a NACK packet containing a Picture Loss Indication (PLI) 98. The PLI indication 98 notifies the retransmission system 86 to send all of the information needed to join a new identified media stream 102. This is different from the retransmission request messages 28 in FIG. 1 that instead requests specific lost packets from an already connected media stream.

The channel join request 96 is sent by the media stream receiver 24 to the feedback target address 100 for the retransmission system 86 associated with the identified new media stream 102. It is worth noting that initiation of the fast channel/stream join scheme is similar to the repair scheme described above since it exploits the same NACK and retransmission machinery.

Figure 6:
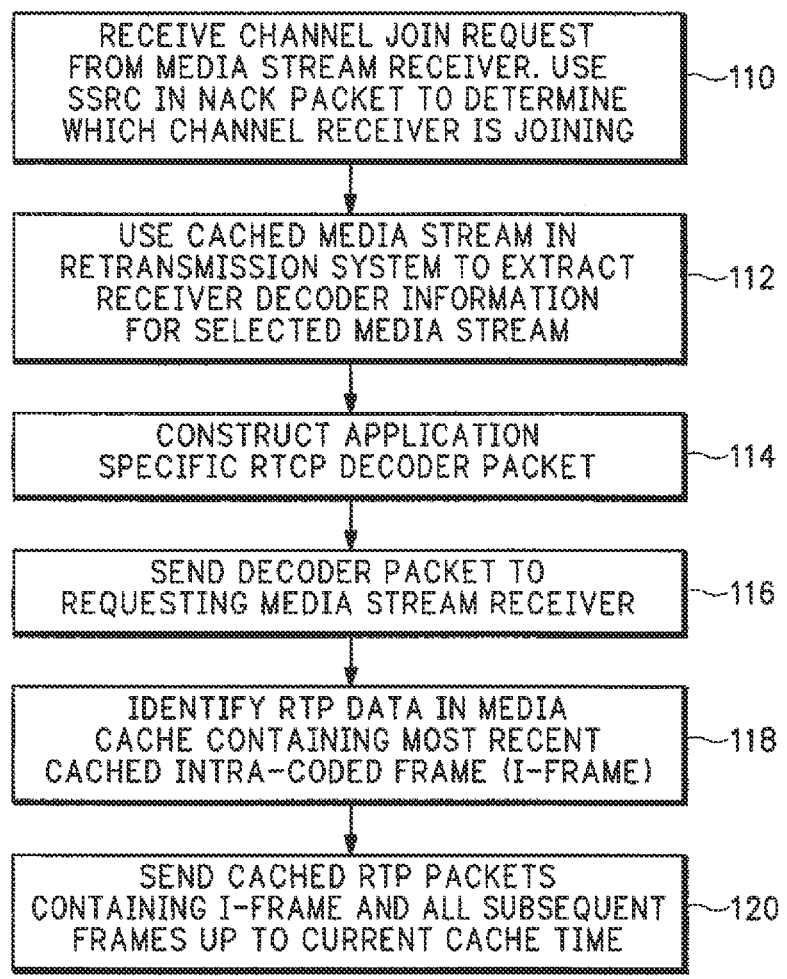
FIG. 6 is a flow diagram explaining in more detail the retransmission scheme shown in FIG. 5.

Referring to both FIG. 5 and FIG. 6, the retransmission system 86 performs the following operations when the channel join request 96 is received. In operation 110, the retransmission system 86 determines which media stream channel the receiver 24 is joining using the SSRC 102 in the unicast NACK channel join request 96 and the destination transport address and port of the NACK packet. As described above, the SSRC 102 was previously communicated to the receiver 24 in the channel description of SDP message 84.

In operation 112, the retransmission system 86 uses the cached video information for the selected media stream to extract from the cache all the elements the receiver 24 may need to "prime" its decoder 97. This may include a Moving Pictures Experts Group (MPEG) Program Association Table (PAT) and Program Map Table (PMT) elements, Encryption Control Messages (ECMs) and possibly other non-video data needed by the decoder 97. The retransmission system 86 in operation 114 constructs a Real-time Transport Control Protocol (RTCP) APPlication-specific (APP) decoder packet 88 and in operation 116 sends the decoder priming packet 88 to the media stream receiver 26 that requested the channel join.

In operation 118, the retransmission system 86 references back into media cache 87 for the RTP data containing the most recent cached intra-coded frame (I-frame). In operation 120, the retransmission system 86 sends the cached RTP packets containing the I-frame and all subsequent frames 90 up to a current cache time to the media stream receiver 24. The identified frames 90 are burst to the receiver 24 at a much faster speed than what the media in the packets is actually rendered by receiver 24 (i.e., faster than real-time). This speeds up the channel join process by allowing the receiver to render video going back to the previous I-frame.

The portions of the stream sent back are not necessary to simply join the new stream. The receiver can join the stream just by knowing the SDP for the media stream and performing a conventional IGMP join operation without asking for channel join. The burst of the cached data back from the prior I-frame allows the receiver to start rendering before the join completes and the next I-frame arrives. If the data were not burst faster than real-time, the receiver would not be able to "catch up" with the multicast stream, which is ahead of the receiver in time. Thus, the burst frames are essentially "back filling" to the previous I-frame so the receiver is able to render media prior to when the next I-frame arrives on the multicast stream.

The decoder 97 in the receiver 24 is primed with the information from the decoder packet 88 and media frames 90. After being primed and receiving the burst, the receiver 24 can join the multicast group for the new stream and can start rendering any subsequent media from the joined multicast media stream 82N.

As with the basic packet repair operations, the fast channel join scheme can exploit any of the anycast-based availability and load sharing features provided either by the look aside mode scheme in FIGS. 2 and 3 or the source mode scheme shown in FIG. 4. Various embodiments are anticipated whereby the repair or channel join schemes are used by service providers offering IPTV service over a variety of access networks, including, but not limited to, Digital Subscriber Loop (DSL), cable, WiMax, etc.

It is also worth noting that the media repair and channel join schemes are essentially stateless. They maintain no state about individual receivers except during a repair or channel join operation. This allows the system to scale much better than a system in which permanent or semi-permanent state is kept in the retransmission system about each receiver potentially wishing to request repair or channel join operations. The normal routing states in the routers in the IP network provide any knowledge required for ensuring retransmission requests or channel join requests are directed to operational retransmission systems 18. The routing metrics in the IP network routers also, as a by-product, provide a degree of load balancing.

Thus, the media source, retransmission systems, and media stream receivers associated with a media stream are not required to keep track of which media stream sources or which retransmission systems are operational, or which media stream receivers are currently connected to which media streams.

The RTP unicast repair scheme also does not require the retransmission systems to remember what repair or channel join packets have been previously received or sent to media stream receivers. Each retransmission or channel join request can be a single unitary request that is answered with a single response or group of responses by the retransmission system with no required state knowledge of what other repair operations have been previously performed for the requesting receiver.

Thus, the use of RTP protocol machinery with the above described extensions allows the creation of a unified technique for both retransmission-based media stream repair and fast channel joining (i.e., stream joining). Operation in either the lookaside mode or source mode can use anycast-based feedback addressing to improve scalability, robustness, and performance. Separate operations are unified with common mechanisms and low protocol, state, and computational overhead.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/We claim all modifications and variation coming within the spirit and scope of the following claims.

What is claimed is:

1. One or more non-transitory computer readable storage media encoded with software comprising computer executable instructions and when the software is executed operable to:

receive a channel join request from a media stream receiver;

identify a channel the media stream receiver is joining using a Synchronization SouRCe (SSRCs) in a NACK packet to determine which channel the media stream receiver is joining;

extract the media stream receiver decoder information for a selected media stream;

construct an application specific decoder packet;

send the decoder packet to the media stream receiver;

identify data in a media cache containing a most recent cached intra-coded frame (I-frame); and send cached packets containing I-frame and subsequent frames up to a current cache time.

2. The one or more non-transitory computer readable storage media encoded with software comprising computer executable instructions of claim 1, wherein the software when executed is further operable to identify the SSRC out of band to the media stream receiver.

3. The one or more non-transitory computer readable storage media encoded with software comprising computer executable instructions of claim 1, wherein the channel join request is a NACK packet containing a Picture Loss Indication.

4. A method comprising:
   receiving a channel join request from a media stream receiver;
   identifying a channel the media stream receiver is joining using a Synchronization SouRCe (SSRCs) in a NACK packet to determine which channel the media stream receiver is joining;
   extracting the media stream receiver decoder information for a selected media stream;
   constructing an application specific decoder packet;
   sending the decoder packet to the media stream receiver;
   identifying data in a media cache containing a most recent cached intra-coded frame (I-frame); and
   sending cached packets containing I-frame and subsequent frames up to a current cache time.

5. The method of claim 4, further comprising identifying the SSRC out of band to the media stream receiver.

6. The method of claim 4, wherein receiving the channel join request comprises receiving the channel join request comprising a NACK packet containing a Picture Loss Indication.

7. A system comprising:
   a memory storage; and
   a processing unit coupled to the memory storage, wherein the processing unit is operative to:
      receive a channel join request from a media stream receiver wherein the channel join request is a NACK packet containing a Picture Loss Indication;
      identify a channel the media stream receiver is joining;
      extract the media stream receiver decoder information for a selected media stream;
      construct an application specific decoder packet;
      send the decoder packet to the media stream receiver;
      identify data in a media cache containing a most recent cached intra-coded frame (I-frame); and
      send cached packets containing I-frame and subsequent frames up to a current cache time.

8. The system of claim 7, wherein the processing unit is further operative to use an Synchronization SouRCe (SSRCs) in a NACK packet to determine which channel the media stream receiver is joining.

9. The system of claim 7, wherein the processing unit is further operative to identify the SSRC out of band to the media stream receiver.

* * * * *